US012529867B2

(12) United States Patent
Liu et al.

(10) Patent No.: US 12,529,867 B2
(45) Date of Patent: Jan. 20, 2026

(54) OPTICAL LENS, CAMERA MODULE AND CAMERA (71) Applicant: JIANGXI LIANYI OPTICS CO., LTD., Nanchang (CN)

(72) Inventors: Xuming Liu, Nanchang (CN); Lili Xu, Nanchang (CN); Haojie Zeng, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 565 days.

(21) Appl. No.: 17/962,500

(22) Filed: Oct. 8, 2022

(65) Prior Publication Data

US 2023/0049672 A1 Feb. 16, 2023

Related U.S. Application Data (63) Continuation-in-part of application No. PCT/CN2020/101749, filed on Jul. 14, 2020.

(30) Foreign Application Priority Data

Apr. 13, 2020 (CN) .......................... 202010282954.1

(51) Int. Cl.
*G02B 9/62* (2006.01)
(52) U.S. Cl.
CPC ....................................... *G02B 9/62* (2013.01)
(58) Field of Classification Search
CPC .............................. G02B 9/62; G02B 13/0045
See application file for complete search history.

(56) References Cited

U.S. PATENT DOCUMENTS

2020/0096742 A1 3/2020 Huang

FOREIGN PATENT DOCUMENTS

| CN | 103576296 A | 2/2014 |
|---|---|---|
| CN | 203606554 0 | 5/2014 |
| CN | 203838391 U | 9/2014 |
| CN | 203909381 U | 10/2014 |
| CN | 104678537 A | 6/2015 |
| CN | 105223677 A | 1/2016 |
| CN | 105807407 A | 7/2016 |
| CN | 107422459 A | 12/2017 |
| CN | 107783255 A | 3/2018 |
| CN | 108681034 A | 10/2018 |
| CN | 208239711 U | 12/2018 |

(Continued)

OTHER PUBLICATIONS

WIPO, International Search Report for PCT Application No. PCT/CN2020/101749, Jan. 12, 2021.

(Continued)

*Primary Examiner* — Jack Dinh (57) ABSTRACT

The disclosure provides an optical lens, a camera module and a camera. The optical lens, from an object side to an image side along an optical axis, sequentially includes a stop, a first lens, a second lens, a third lens, a fourth lens, a fifth lens, a sixth lens, and a filter. The optical lens meets the expression of: $SAG8D_{0.5}SAG8D_1 > 0.35$, where $SAG8D_{0.5}$ represents a sagittal height at a position corresponding to half a diameter of an image side surface of the fourth lens, and $SAG8D_1$ represents a sagittal height at a position corresponding to the diameter of an image side surface of the fourth lens.

20 Claims, 8 Drawing Sheets (56) References Cited

FOREIGN PATENT DOCUMENTS

| CN | 208872934 U | 5/2019 |
|---|---|---|
| CN | 209055738 U | 7/2019 |
| CN | 110727087 A | 1/2020 |
| JP | 2019109483 A | 7/2019 |
| WO | 2019131368 A1 | 7/2019 |

OTHER PUBLICATIONS

WIPO, Written opinion of the International Search Authority for PCT Application No. PCT/CN2020/101749, Jan. 12, 2021.
SIPO, First Office Action for CN Application No. 202010282954.1, Jun. 1, 2020.
SIPO, Office Action for CN Application No. 202010282954.1, Jun. 17, 2020.

OPTICAL LENS, CAMERA MODULE AND CAMERA

CROSS-REFERENCES TO RELATED APPLICATION(S)

This application is a continuation-in-part of an international application No. PCT/CN2020/101749 filed on Jul. 14, 2020. This international application claims priority to Chinese application No. 202010282954.1, filed with the Chinese Patent Office on Apr. 13, 2020. The entirety of the two applications is hereby incorporated herein by reference.

TECHNICAL FIELD

The disclosure relates to the field of optical lens technologies, and more particularly, to an optical lens, a camera module and a camera.

BACKGROUND

At present, with the popularization of portable electronic devices (such as smart phones, and cameras) and the popularity of social, video, and live broadcast software, people are becoming more and more fond of photography. Optical lenses have become the conventional components of portable electronic devices. The optical lens has even become the primary consideration for consumers when purchasing portable electronic devices. In recent years, with the continuous development of design level and manufacturing technology, the optical lens is developing towards high performance.

However, with the continuous improvement of people's requirements for imaging quality, on the one hand, the structure of the lens will be correspondingly complicated, resulting in increased processing difficulty and low product yield; on the other hand, the impact of ambient light on the imaging quality is also increasing, which leads to low product yield and ghost image being difficult to eliminate when the imaging quality is ensured.

SUMMARY

In an aspect, an embodiment of the disclosure provides an optical lens. The optical lens, from an object side to an image side along an optical axis, sequentially includes a stop, a first lens, a second lens, a third lens, a fourth lens, a fifth lens, a sixth lens, and a filter. The first lens has a positive focal power, and an object side surface of the first lens is convex. The second lens has a negative focal power, and an image side surface of the second lens is concave. The third lens has a positive focal power, and an object side surface and an image side surface of the third lens are both convex and of no inflection point. The fourth lens has a positive focal power, an object side surface of the fourth lens is concave, and an image side surface of the fourth lens is convex proximate to the optical axis. The fifth lens has a negative focal power, an object side surface of the fifth lens is convex proximate to the optical axis, and an image side surface of the fifth lens is concave proximate to the optical axis. The sixth lens has a negative focal power, and an object side surface of the sixth lens is concave proximate to the optical axis. The optical lens meets the following expression:

$$SAG8D_{0.5}/SAG8D_1 > 0.35;$$

where $SAG8D_{0.5}$ represents a sagittal height at a position corresponding to half a diameter of the image side surface of the fourth lens, and $SAG8D_1$ represents a sagittal height at a position corresponding to the diameter of the image side surface of the fourth lens.

In another aspect, an embodiment of the disclosure further provides an imaging device. The imaging device includes an imaging component and the optical lens provided in the first aspect. The imaging component is configured to convert an optical image formed by the optical lens into electrical signals.

In further another aspect, a camera module is provided, which includes the above-mentioned optical lens and an image sensor opposite to the optical lens.

In still further another aspect, a camera is provided, which includes the camera module as mentioned above, a processor and a memory. The camera module is configured to capture one or more images. The processor is configured to process the captured one or more images. The memory is configured to store the captured one or more images.

These and other aspects of the disclosure will be more concise and understandable in the description of the following embodiments.

BRIEF DESCRIPTION OF THE DRAWINGS

In order to explain the technical solutions in the embodiments of the disclosure more clearly, the drawings required in the description of the embodiments will be briefly introduced below. Obviously, the drawings in the following description are only some embodiments of the disclosure.

DETAILED DESCRIPTION OF PREFERRED EMBODIMENTS

In order to facilitate the understanding of the disclosure, the disclosure will be described more fully below with reference to the relevant drawings. Several embodiments of the disclosure are shown in the drawings. However, the disclosure can be implemented in various different forms and is not limited to the embodiments described herein. On the contrary, the purpose of providing these embodiments is to make the disclosure of the invention more sufficient and comprehensive.

Unless otherwise defined, all technical and scientific terms used herein have the same meaning as those commonly understood by those of ordinary skill in the technical field of the disclosure. The terms used in the specification of the disclosure herein are only for the purpose of describing specific embodiments, and are not intended to limit the disclosure. The term "and/or" as used herein includes any and all combinations of one or more related listed items.

Figure 1:
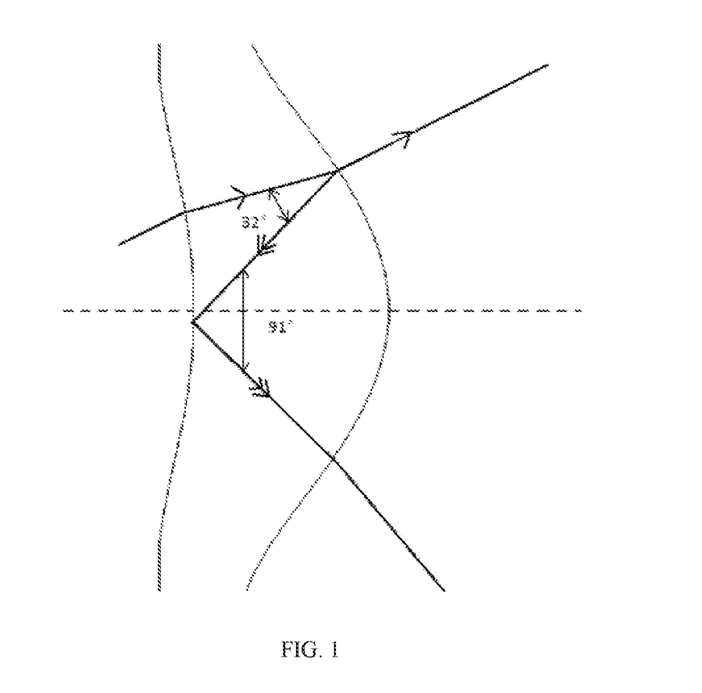
FIG. 1 is a diagram showing an internal reflection light path of light that forms a ghost image, in a fourth lens of a six-piece optical lens in the related art.

The refractive index Nd of commonly used plastic materials is generally 1.5 to 1.7, therefore, based on the Critical Angle Theorem $\theta_c=\arcsin(1/Nd)$, the range of the critical angle $\theta_c$ is obtained to be from 36° to 42° while the light transmits from optically denser medium to optically thinner medium. Inside a lens, for example, the light incident into the lens will be reflected (primary reflection) at the image side surface of the lens, and then be reflected (secondary reflection) at the object side surface of the lens. Total reflection occurs when the secondary reflection angle is greater than the critical angle (for example, 42°). In the research of existing lenses, the inventor found that the curved surface of the fourth lens of the six-piece lens in the related art is relatively curved, and commonly there is a total reflection ghost image generated in the field, and a detailed reflection path is shown in FIG. 1, wherein a secondary reflection angle at the object side surface of the fourth lens is greater than 42° and is greater than the critical angle, thereby resulting in total reflection and high-energy ghost image. At present, the phenomenon of total reflection ghost image cannot be improved only by coating technology, so it has a great impact on imaging quality.

Based on this, the disclosure provides an optical lens. The optical lens, from an object side to an image side along an optical axis, sequentially includes a stop, a first lens, a second lens, a third lens, a fourth lens, a fifth lens, a sixth lens, and a filter.

The first lens has a positive focal power, and an object side surface of the first lens is convex.

The second lens has a negative focal power, and an image side surface of the second lens is concave.

The third lens has a positive focal power, and an object side surface and an image side surface of the third lens are both convex and of no inflection points.

The fourth lens has a positive focal power, an object side surface of the fourth lens is concave, and an image side surface of the fourth lens is convex proximate to the optical axis.

The fifth lens has a negative focal power, an object side surface of the fifth lens is convex proximate to the optical axis, and an image side surface of the fifth lens is concave proximate to the optical axis. The shape of the fifth lens can effectively correct the aberration of the optical lens, thereby effectively controlling the outgoing angle of the light.

The sixth lens has a negative focal power, and an object side surface of the sixth lens is concave proximate to the optical axis.

The optical lens meets the following expression:

$$SAG8D_{0.5}/SAG8D_1>0.35 \quad (1)$$

where $SAG8D_{0.5}$ represents a sagittal height at a position corresponding to half a diameter of the image side surface of the fourth lens, and $SAG8D_1$ represents a sagittal height at a position corresponding to the diameter of the image side surface of the fourth lens.

When the expression (1) is satisfied, the reflection angle of the incident light in the field (for example, the field of view is about 20°) with respect to the image side surface of the fourth lens can be reduced, such that the incident angle of the light of the secondary reflection with respect to the object side surface is accordingly reduced and thus less than the critical angle, so as not to form a total reflection at the object side surface of the fourth lens. Part of the energy of the light is consumed in the refraction at the object side surface, thereby weakening the energy of the reflected light at the object side surface, that is, the energy of the ghost image is weakened. By satisfying the expression (1), the curved shape of the image side surface of the fourth lens can be reasonably limited, thereby effectively improving the problem of ghost image and improving the imaging quality.

Compared with the prior art, by reasonably selecting the lens shapes and focal powers of respective lenses, and by adjusting the surface shape of the fourth lens, the optical lens and imaging device provided by the disclosure change the incident angle of the ghost image, and avoid a total reflection ghost image generated in the field of the fourth lens, thereby effectively reducing the influence of ghost image on imaging quality, while achieving a high-definition imaging effect, with the advantage of high imaging quality, the user experience can be effectively improved.

In some embodiments, the optical lens meets the following expression:

$$R_7/D_7<-0.7 \quad (2)$$

where $R_7$ represents a radius of curvature of the object side surface of the fourth lens, and $D_7$ represents a diameter of the object side surface of the fourth lens.

When the expression (2) is satisfied, it indicates that the object side surface of the fourth lens is smoother proximate to optical axis, so that the reflection angle of the light of the secondary reflection with respect to the object side surface of the fourth lens is increased, while ensuring that the reflection angle is not greater than the critical angle, in this way, the ghost image is reflected outside the image plane, the energy of the ghost image is reduced. By the restriction of expression (2), the curved shape of the object side surface of the fourth lens can be further reasonably limited, thereby effectively improving the problem of ghost image and improving the imaging quality.

In the prior art, the focal power of the first lens of the optical lens used in portable electronic device is usually large, but the diameter is small, as a result, the first lens has high decentering sensitivity (the influence of the decentering of the optical axis of the lens on the whole imaging), difficult processing, and low product yield. In some embodiments, the optical lens meets the following expressions:

$$-0.12 < (1/f_1 - 1/f_3)/(1/f) < 0.2; \quad (3)$$

$$R_1/D_i > 0.98; \quad (4)$$

where $f_1$ represents a focal length of the first lens, $f_3$ represents a focal length of the third lens, f represents a focal length of the optical lens, $R_1$ represents a radius of curvature of the object side surface of the first lens, and $D_i$ represents an entrance pupil diameter of the optical lens.

In some embodiments, when the expression (3) is satisfied, the decentering sensitivity of the first lens can be shared to the third lens. That is, making the diameter of the third lens relatively large, the decentering sensitivity will not be very large. By balancing the decentering sensitivity of the first lens and the third lens, the difficulty of production and processing can be greatly reduced, so that the product yield of the lens can be effectively improved while ensuring high imaging quality.

When the expression (4) is satisfied, the diameter of the first lens can be reasonably limited, the larger the diameter, the lower the sensitivity, thereby reducing the sensitivity of the first lens, and alleviating the problem of low product yield caused by the high sensitivity of the first lens.

Further, in some embodiments, the optical lens meets the following expression:

$$4.13 \text{ mm} < IH/\tan \theta < 4.18 \text{ mm}; \quad (5)$$

where IH represents half an actual image height of the optical lens, and θ represents half a field of view of the optical lens.

The expression (5) limits the distortion of the optical lens. When IH/tan θ>4.13 mm, the distortion of the lens is prevented from increasing in the negative direction, and when IH/tan θ<4.18 mm, the distortion is prevented from increasing excessively in the positive direction, thereby reducing the difficulty of correcting distortion.

In some embodiments, the optical lens meets the following expression:

$$1 < DT/D_1 < 1.02; \quad (6)$$

where DT represents a diameter of the stop of the optical lens, and $D_1$ represents a diameter of the object side surface of the first lens. When $DT/D_1 > 1$, it indicates that the field of view of the optical lens is larger and the shooting scene is wider; when $DT/D_1 < 1.02$, the difficulty of correcting aberrations is reduced.

In some embodiments, the optical lens meets the following expression:

$$0.46 < DT/IH < 0.49; \quad (7)$$

where DT represents a diameter of the stop of the optical lens, and IH represents half an actual image height of the optical lens. When DT/IH>0.46, the light flux of the optical lens is effectively guaranteed; when DT/IH<0.49, an optical lens with high pixels and high imaging quality can be obtained, thereby meeting the high requirements of modern people for photography.

In some embodiments, the optical lens meets the following expressions:

$$SAG5_i - SAG5_j < 0; \quad (8)$$

$$SAG6_i - SAG6_j < 0; \quad (9)$$

where j=i+0.1, $SAG5_i$ represents a sagittal height at a position of the object side surface of the third lens spaced from the optical axis i mm, $SAG5_j$ represents a sagittal height at a position of the object side surface of the third lens spaced from the optical axis j mm, $SAG6_i$ represents a sagittal height at a position of the image side surface of the third lens spaced from the optical axis i mm, and $SAG6_j$ represents a sagittal height at a position of the image side surface of the third lens spaced from the optical axis j mm. By satisfying the expressions (8) and (9), the curved shape of the third lens is reasonably limited, so that the object side surface of the third lens and the image side surface of the third lens have no inflection points, thereby avoiding the increase of decentering sensitivity.

In some embodiments, the optical lens meets the following expression:

$$-1 < f_1/f_2 < -0.3; \quad (10)$$

where $f_1$ represents a focal length of the first lens, and $f_2$ represents a focal length of the second lens. When $f_1/f_2 > -1$, the focal power and decentering sensitivity of the first lens can be prevented from becoming larger; when $f_1/f_2 < -0.3$, the difficulty of correcting field curvature can be reduced.

In some embodiments, the optical lens meets the following expression:

$$0 < \theta_{12}/\theta_\lambda < 0.15; \quad (11)$$

where $\theta_{12}$ represents a dip angle at an edge of an image side surface of the sixth lens (an angle between a surface edge tangent of an image side surface of the sixth lens and the optical axis), and $\theta_\lambda$ represents a chief ray angle of the optical lens, which is also an imaging plane angle. When $\theta_{12}/\theta_\lambda > 0$, the chief ray angle (CRA) can be effectively controlled; when $\theta_{12}/\theta_\lambda < 0.15$, the dip angle at an edge of the image side surface of the sixth lens can be prevented from increasing, thereby avoiding a ghost image.

In some embodiments, the optical lens meets the following expression:

$$-0.5 < R_8/D_8 < -0.3; \quad (12)$$

where $R_8$ represents a radius of curvature of the image side surface of the fourth lens, and $D_8$ represents a diameter of the image side surface of the fourth lens. When $R_8/D_8 < -0.3$, it indicates that the image side surface of the fourth lens has a larger radius of curvature, which is beneficial to reduce the energy of the ghost image; when $R_8/D_8 > -0.5$, the diameter of the image side surface of the fourth lens is effectively limited, thereby reducing decentering sensitivity.

In an embodiment, the first lens, the second lens, the third lens, the fourth lens, the fifth lens, and the sixth lens may be aspherical lenses. The use of aspherical lenses can effectively reduce the number of lenses, correct aberrations, and provide better optical performance.

In this embodiment, as an implementation, when each lens in the optical lens is an aspherical lens, each aspherical surface of the optical lens 100 may all satisfy the following equation:

$$z = \frac{ch^2}{1 + \sqrt{1 - (1+k)c^2h^2}} + \sum A_{2i}h^{2i}$$

where z represents a sagittal height at a position of an aspherical surface spaced from the optical axis h, that is, a distance with respect to a vertex of the aspherical surface, c represents a paraxial radius of curvature of the aspherical surface, k represents a conic coefficient, and $A_{2i}$ represents a 2i-th order aspheric surface shape coefficient.

Further, in some embodiments, a maximum diameter of the sixth lens is greater than that of each of the first lens, the second lens, the third lens, the fourth lens and the fifth lens.

Further, in some embodiments, at least a portion away from the optical axis of the object side surface of the fifth lens is concave, and at least a portion away from the optical axis of the image side surface of the fifth lens is convex.

Further, in some embodiments, an image side surface of the first lens is concave, and an object side surface of the second lens is convex.

By reasonably selecting the lens shapes and focal powers of the first lens, the second lens, the third lens, the fourth lens, the fifth lens, and the sixth lens, the optical lens of this embodiment effectively reduces the decentering sensitivity of the optical lens, reduces the influence of ghost image on imaging, and achieves the effects of high pixels, clear imaging, and high product yield.

In each of the following embodiments, the thickness of each lens of the optical lens may be different from each other, as well as the radius of curvature, and the material. For specific differences, please refer to the parameter table in each embodiment.

First Embodiment

Figure 2:
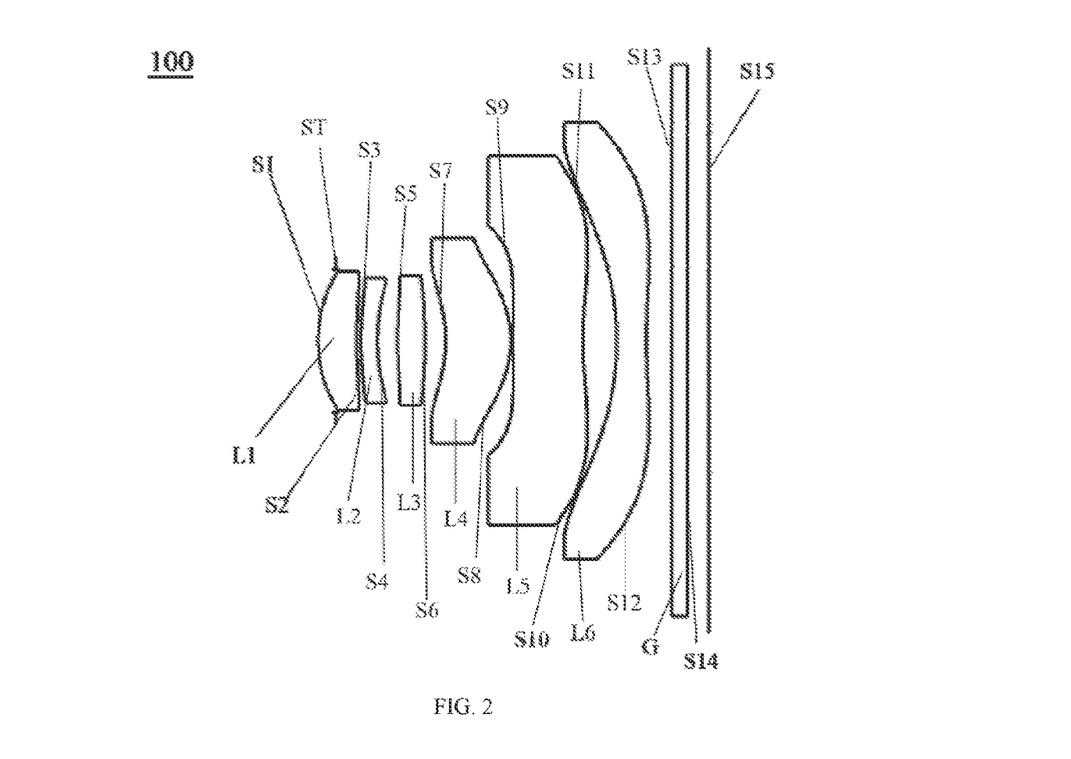
FIG. 2 is a schematic structural diagram of an optical lens, according to a first embodiment of the disclosure.

FIG. 2 illustrates a schematic structural diagram of an optical lens 100, according to the first embodiment of the disclosure. The optical lens 100, from an object side to an image side along an optical axis, sequentially includes a stop ST, a first lens L1, a second lens L2, a third lens L3, a fourth lens L4, a fifth lens L5, a sixth lens L6, and a filter G.

The first lens L1 has a positive focal power, an object side surface S1 of the first lens is convex, and an image side surface S2 of the first lens is concave.

The second lens L2 has a negative focal power, an object side surface S1 of the second lens is convex, and an image side surface S4 of the second lens is concave.

The third lens L3 has a positive focal power, an object side surface S and an image side surface S6 of the third lens are both convex and of no inflection points.

The fourth lens L4 has a positive focal power, an object side surface S7 of the fourth lens is concave, and an image side surface S8 of the fourth lens is convex proximate to the optical axis.

The fifth lens L5 has a negative focal power, an object side surface S9 of the fifth lens is convex proximate to the optical axis, and an image side surface S10 of the fifth lens is concave proximate to the optical axis.

The sixth lens L6 has a negative focal power, and an object side surface S11 of the sixth lens is concave proximate to the optical axis, and an image side surface S12 of the sixth lens is concave proximate to the optical axis.

The first lens L1, the second lens L2 the third lens L3 the fourth lens L4 the fifth lens L5 and the sixth lens L6 are aspherical lenses.

Specifically, the design parameters of the optical lens 100 provided in this embodiment are shown in Table 1.

TABLE 1

| Surface No. | | Radius of curvature (mm) | Thickness (mm) | Refractivity | Abbe number |
|---|---|---|---|---|---|
| | Object plane | — | — | | |
| ST | Stop | — | −0.243 | | |
| S1 | First lens L1 | 1.817 | 0.533 | 1.5439 | 55.951 |
| S2 | | 4.875 | 0.057 | | |
| S3 | Second lens L2 | 3.131 | 0.226 | 1.6355 | 23.972 |
| S4 | | 2.338 | 0.277 | | |
| S5 | Third lens L3 | 5.096 | 0.377 | 1.535 | 55.711 |
| S6 | | −10.005 | 0.285 | | |
| S7 | Fourth lens L4 | −1.925 | 0.901 | 1.535 | 55.711 |
| S8 | | −1.397 | 0.028 | | |
| S9 | Fifth lens L5 | 17.137 | 0.965 | 1.6613 | 20.373 |
| S10 | | 4.870 | 0.467 | | |
| S11 | Sixth lens L6 | −3.903 | 0.412 | 1.535 | 55.711 |
| S12 | | 8.459 | 0.35 | | |
| S13 | Filter G | — | 0.21 | 1.5168 | 64.212 |
| S14 | | — | 0.295 | | |
| S15 | Imaging plane | — | — | | |

In this embodiment, the aspherical coefficients at each lens included in the optical lens 100 are shown in Table 2.

TABLE 2

| Surface No. | k | $A_4$ | $A_6$ | $A_8$ | $A_{10}$ | $A_{12}$ | $A_{14}$ | $A_{16}$ |
|---|---|---|---|---|---|---|---|---|
| S1 | −2.5E−01 | 1.01E−02 | −6.23E−03 | 1.51E−02 | −1.78E−02 | −1.05E−03 | 1.92E−02 | −1.94E−02 |
| S2 | −1.90E+02 | −4.33E−02 | 7.97E−02 | −1.63E−02 | −5.99E−02 | −2.77E−02 | 1.250E−02 | 1.03E−02 |
| S3 | −6.51E+01 | −8.39E−02 | 1.77E−01 | −7.21E−02 | −4.02E−02 | −3.37E−02 | −7.16E−03 | 3.41E−02 |
| S4 | −2.38E+01 | 5.72E−02 | 7.33E−02 | 2.42E−02 | 1.91E−03 | −3.17E−02 | −2.63E−02 | 3.30E−02 |
| S5 | 2.04E+01 | −8.21E−02 | −3.41E−03 | −6.97E−02 | 1.58E−02 | 3.38E−03 | −1.08E−02 | 8.73E−03 |
| S6 | −1.22E+02 | −1.51E−02 | −1.14E−02 | −2.02E−02 | −2.48E−04 | 6.04E−03 | −5.54E−03 | 6.17E−03 |
| S7 | −4.36E+00 | 4.75E−04 | 3.35E−02 | 1.56E−03 | −2.62E−03 | −8.20E−05 | 4.13E−04 | −1.93E−04 |
| S8 | −3.61E+00 | −6.35E−02 | 2.71E−02 | 1.28E−03 | 3.01E−04 | −3.65E−05 | −1.25E−05 | −2.11E−05 |
| S9 | 9.95E+01 | −4.89E−02 | −8.18E−03 | 1.80E−03 | −2.12E−04 | −2.25E−04 | −2.86E−05 | 1.06E−05 |
| S10 | −4.38E+01 | −1.80E−02 | −3.56E−04 | 1.21E−04 | 5.41E−06 | −1.06E−06 | −8.17E−08 | 1.01E−08 |
| S11 | −1.34E+00 | −2.44E−03 | 5.79E−04 | 4.60E−05 | 1.92E−07 | −3.10E−07 | −2.43E−08 | 2.56E−09 |
| S12 | −1.52E+01 | −2.56E−02 | 3.14E−03 | −3.37E−04 | 1.95E−05 | −3.35E−07 | −4.89E−08 | 4.57E−09 |

Figure 3:
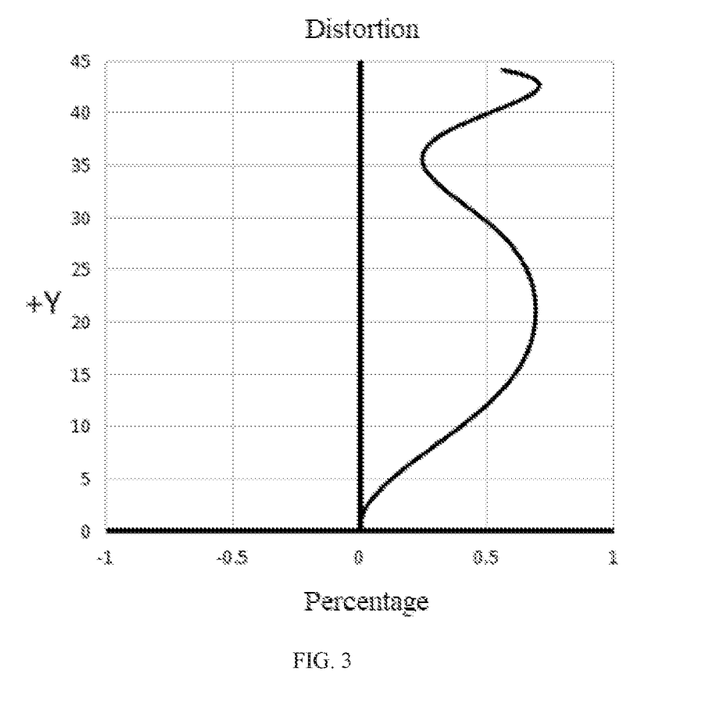
FIG. 3 is a diagram showing a distortion curve of the optical lens, according to the first embodiment of the disclosure.
Figure 4:
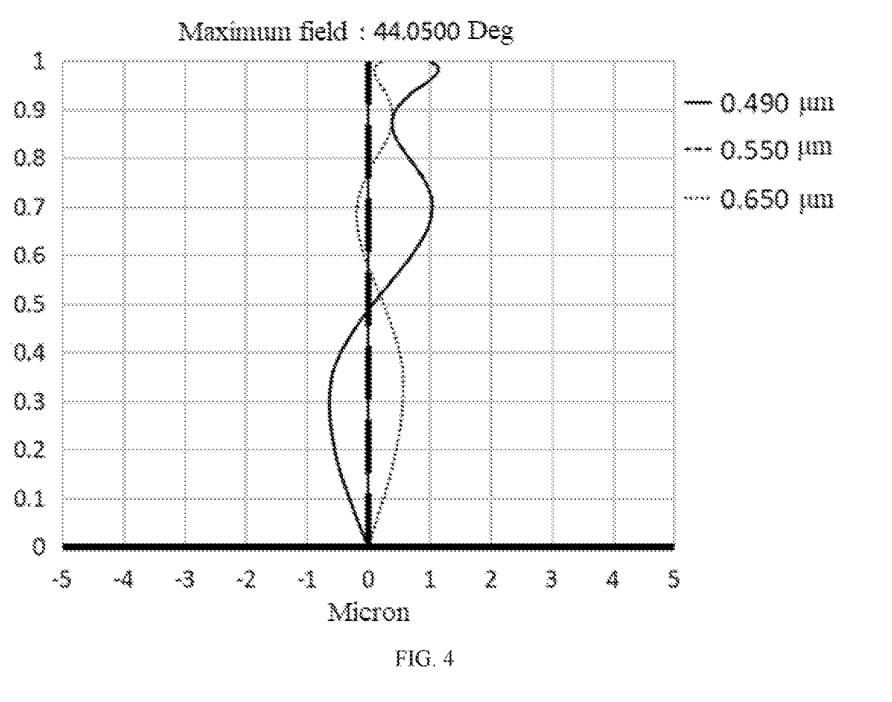
FIG. 4 is a diagram showing lateral chromatic aberration curves of the optical lens, according to the first embodiment of the disclosure.
Figure 5:
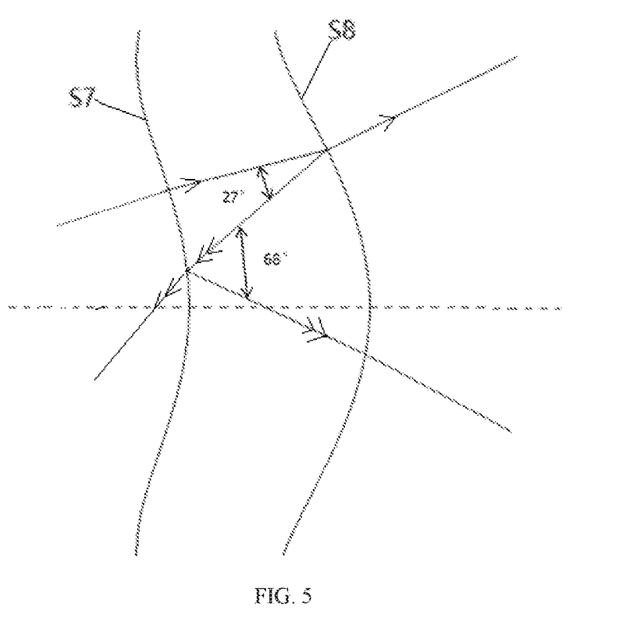
FIG. 5 is a diagram showing an internal reflection light path of light that forms a ghost image, in a fourth lens of the optical lens according to the first embodiment of the disclosure.

FIG. 3 illustrates a diagram showing a distortion curve of the optical lens 100, FIG. 4 illustrates a diagram showing lateral chromatic aberration curves of the optical lens 100, and FIG. 5 illustrates a diagram showing an internal reflection light path of light that forms a ghost image, in the fourth lens L4 of the optical lens 100. As be seen from FIG. 3, the optical distortion is controlled within 0.75%, which indicates that the distortion of the optical lens 100 is well corrected. As be seen from FIG. 4, the lateral chromatic aberration at different wavelengths is controlled within 1.2 μm (the measured data is less than 1.2 μm), which indicates that the lateral chromatic aberration of the optical lens 100 is well corrected. As can be seen from FIG. 5 the incident angle of the second reflection of the ghost image of the fourth lens L4 with respect to the object side surface S7 of the fourth lens is 34°, which does not reach the critical angle, therefore the total reflection will not occur, thereby effectively reducing the energy of the ghost image.

Second Embodiment

Figure 6:
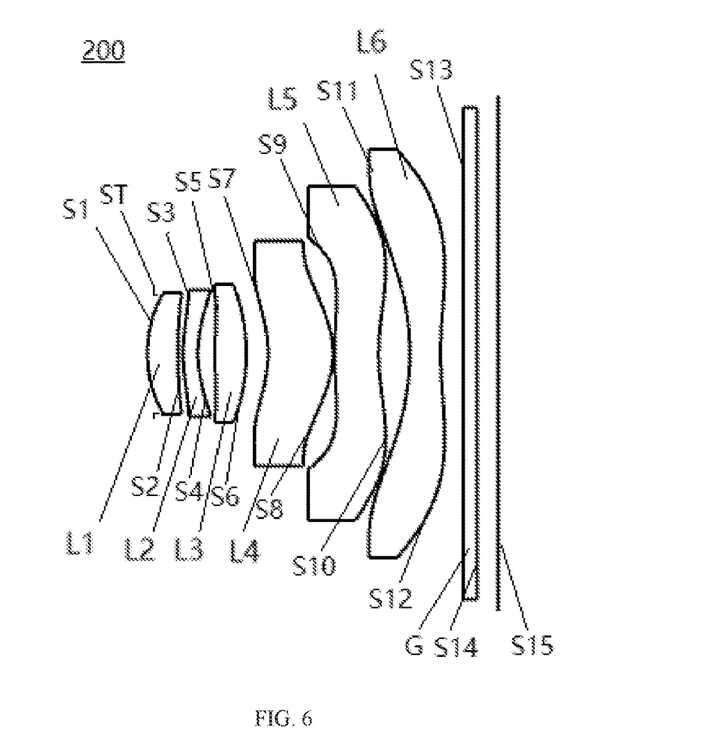
FIG. 6 is a schematic structural diagram of an optical lens, according to a second embodiment of the disclosure.

FIG. 6 illustrates a schematic structural diagram of an optical lens 200, according to the second embodiment. The optical lens 200 of this embodiment is substantially the same as that of the first embodiment mentioned above, and the main difference is that the design parameters are different.

Specifically, the design parameters of the optical lens 200 provided in this embodiment are shown in Table 3.

TABLE 3

| Surface No. | | Radius of curvature (mm) | Thickness (mm) | Refractivity | Abbe number |
|---|---|---|---|---|---|
| | Object plane | — | — | | |
| ST | Stop | — | −0.231 | | |
| S1 | First lens L1 | 2.007 | 0.474 | 1.5439 | 55.951 |
| S2 | | 6.072 | 0.081 | | |
| S3 | Second lens L2 | 2.375 | 0.22.9 | 1.6355 | 23.972 |
| S4 | | 1.743 | 0.264 | | |
| S5 | Third lens L3 | 9.753 | 0.479 | 1.535 | 55.711 |
| S6 | | −3.275 | 0.338 | | |
| S7 | Fourth lens L4 | −1.901 | 1.011 | 1.535 | 55.711 |
| S8 | | −1.348 | 0.028 | | |
| S9 | Fifth lens L5 | 7.371 | 0.677 | 1.6613 | 20.373 |
| S10 | | 2.918 | 0.486 | | |
| S11 | Sixth lens L6 | −4.104 | 0.473 | 1.5162 | 56.936 |
| S12 | | 6.201 | 0.35 | | |
| S13 | Filter G | — | 0.21 | 1.5168 | 64.212 |
| S14 | | — | 0.332 | | |
| S15 | Imaging plane | — | — | | |

In this embodiment, the aspherical coefficients of each lens included in the optical lens 200 are Table 4.

TABLE 4

| Surface No. | k | $A_4$ | $A_6$ | $A_8$ | $A_{10}$ | $A_{12}$ | $A_{14}$ | $A_{16}$ |
|---|---|---|---|---|---|---|---|---|
| S1 | 3.23E−02 | 1.17E−02 | −6.64E−03 | 2.51E−02 | −1.24E−02 | −1.71E−03 | −1.31E−02 | −5.81E−03 |
| S2 | −2.39E+02 | −2.14E−02 | 9.48E−02 | −4.09E−02 | −3.28E−02 | 2.23E−02 | 1.18E−02 | −5.40E−03 |
| S3 | −2.69E+01 | −7.34E−02 | 1.18E−01 | −7.70E−02 | −4.77E−03 | −4.74E−03 | 6.89E−04 | −1.12E−04 |
| S4 | −9.33E400 | 6.72E−03 | 2.00E−02 | 4.19E−03 | −1.10E−02 | −1.21E−02 | −9.06E−03 | 1.02E−02 |
| S5 | 9.34E+00 | −5.77E−02 | 6.93E−03 | −5.37E−02 | 4.28E−02 | 2.51E−02 | −1.28E−02 | −2.13E−04 |
| S6 | −1.54E+01 | −6.32E−02 | −2.39E−03 | −4.19E−03 | 6.20E−03 | 6.00E−03 | −5.11E−03 | 6.89E−03 |
| S7 | −6.60E+00 | −7.89E−03 | 2.57E−02 | 3.26E−03 | −2.48E−03 | −5.10E−04 | 2.63E−04 | −3.21E−05 |
| S8 | −4.54E+00 | −3.00E−02 | 2.19E−02 | −1.42E−02 | −1.32E−03 | −6.97E−05 | −5.26E−07 | 7.77E−07 |
| S9 | 8.2E+00 | −3.83E−02 | −1.40E−02 | 5.57E−03 | −1.15E−03 | −1.86E−04 | 1.38E−05 | 1.27E−05 |
| S10 | −2.85E+01 | −1.86E−02 | 3.43E−05 | −9.90E−05 | −1.53E−05 | 5.54E−06 | 7.29E−07 | −1.15E−07 |
| S11 | −3.05E−01 | −3.17E−03 | 1.71E−03 | −7.93E−06 | −6.10E−06 | −2.39E−07 | 2.74E−08 | 5.84E−10 |
| S12 | −1.75E+00 | −3.03E−02 | 3.23E−03 | −2.66E−04 | 1.83E−05 | −8.75E−07 | −6.96E−08 | 7.68E−09 |

Figure 7:
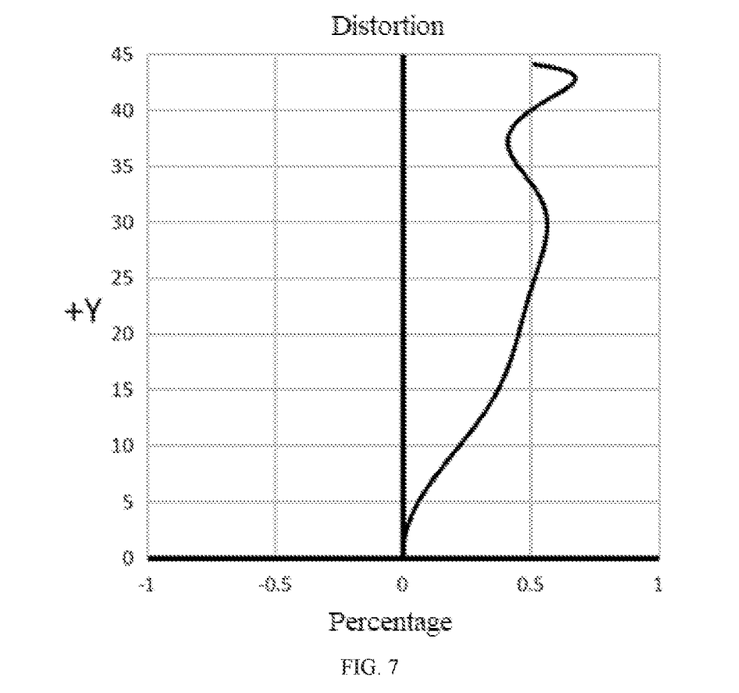
FIG. 7 is a diagram showing a distortion curve of the optical lens, according to the second embodiment of the disclosure.
Figure 8:
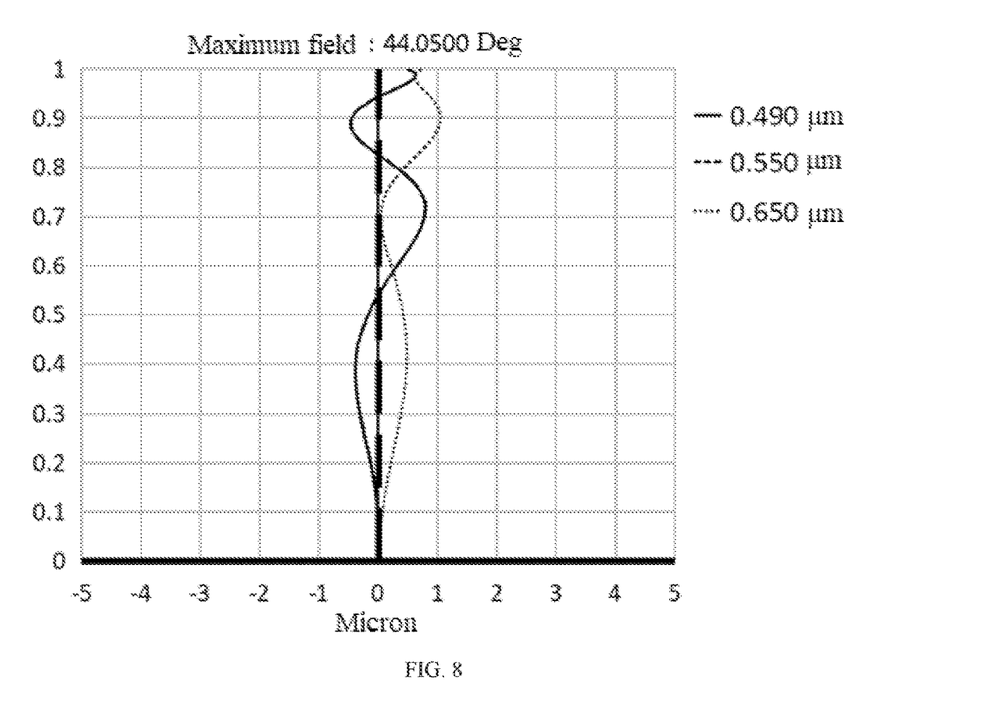
FIG. 8 is a diagram showing lateral chromatic aberration curves of the optical lens, according to the second embodiment of the disclosure.
Figure 9:
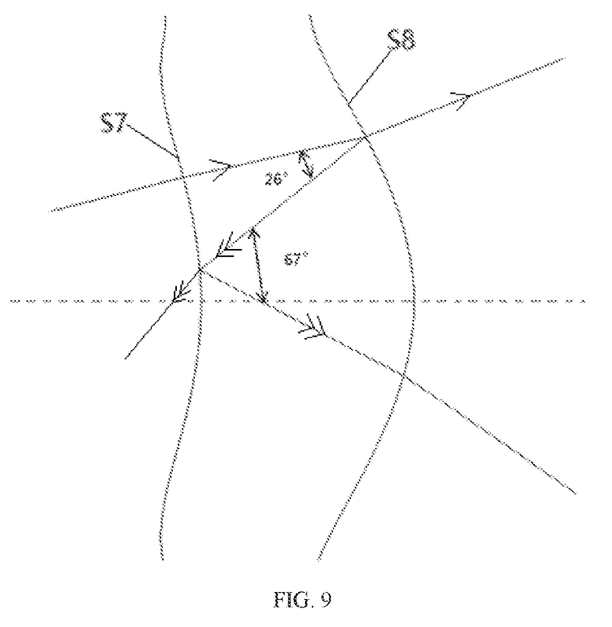
FIG. 9 is a diagram showing an internal reflection light path of light that forms a ghost image, in a fourth lens of the optical lens according to the second embodiment of the disclosure.

FIG. 7 illustrates a diagram showing a distortion curve of the optical lens 200, FIG. 8 illustrates a diagram showing lateral chromatic aberration curves of the optical lens 200, and FIG. 9 illustrates a diagram showing an internal reflection light path of light that forms a ghost image, in the fourth lens L4 of the optical lens 200. As be seen from FIG. 7, the optical distortion is controlled within 0.75%, which indicates that the distortion of the optical lens 200 is well corrected. As be seen from FIG. 8, the lateral chromatic aberration at different wavelengths is controlled within 1.2 μm (the measured data is less than 1.2 μm), which indicates that the lateral chromatic aberration of the optical lens 200 is well corrected. As can be seen from FIG. 9, the incident angle of the second reflection of the ghost image of the fourth lens L4 with respect to the object side surface S7 of the fourth lens is 33.5°, which does not reach the critical angle, thus the total reflection will not occur, thereby effectively reducing the energy of the ghost image.

Third Embodiment

Figure 10:
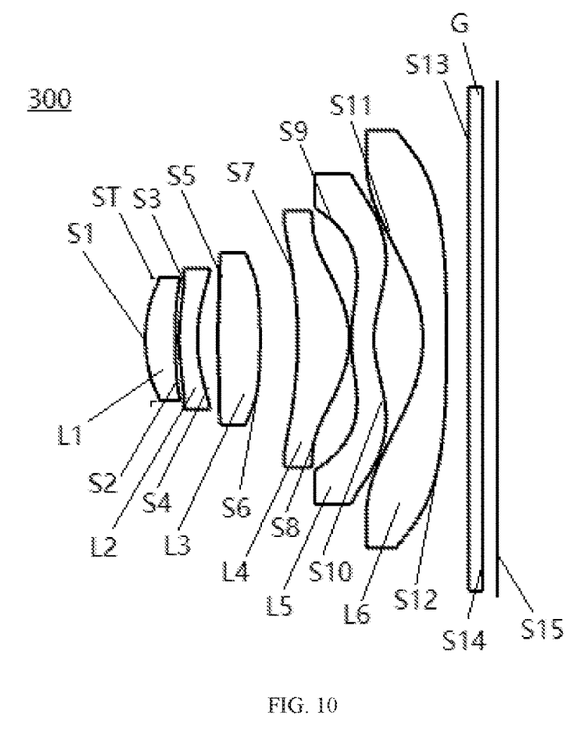
FIG. 10 is a schematic structural diagram of an optical lens, according to a third embodiment of the disclosure.

FIG. 10 illustrates a schematic structural diagram of an optical lens 300, according to the third embodiment. The optical lens 300 of this embodiment is substantially the same as that of the first embodiment mentioned above, and their main difference is that: the curve shapes of the fourth lenses L4 are different, as well as the fifth lenses L5 and the sixth lenses L6. In this embodiment, the object side surface S7 of the fourth lens is smoother, which is beneficial to reduce the energy of the internal reflection ghost image of the fourth lens L4; the object side surface S9 of the fifth lens has a large edge recurvation, that is, a large change in edge curvature, which is beneficial to the correction of aberration; and the image side surface S12 of the sixth lens is convex proximate to the optical axis.

Specifically, the design parameters of the optical lens 300 provided in this embodiment are shown in Table 5.

TABLE 5

| Surface No. | | Radius of curvature (mm) | Thickness (mm) | Refractivity | Abbe number |
|---|---|---|---|---|---|
| | Object plane | — | — | | |
| ST | Stop | — | −0.216 | | |
| S1 | First lens L1 | 2.199 | 0.461 | 1.5439 | 55.951 |
| S2 | | 6.078 | 0.061 | | |
| S3 | Second lens L2 | 2.858 | 0.280 | 1.6355 | 23.972 |
| S4 | | 2.015 | 0.314 | | |
| S5 | Third lens L3 | 7.647 | 0.653 | 1.535 | 55.711 |
| S6 | | −10.563 | 0.581 | | |

TABLE 5-continued

| Surface No. | | Radius of curvature (mm) | Thickness (mm) | Refractivity | Abbe number |
|---|---|---|---|---|---|
| S7 | Fourth lens L4 | −5.368 | 0.800 | 1.535 | 55.711 |
| S8 | | −1.375 | 0.028 | | |
| S9 | Fifth lens L5 | 2.211 | 0.349 | 1.6613 | 20.373 |
| S10 | | 1.382 | 0.760 | | |
| S11 | Sixth lens L6 | −2.009 | 0.355 | 1.535 | 55.711 |
| S12 | | −208.051 | 0.350 | | |

TABLE 5-continued

| Surface No. | | Radius of curvature (mm) | Thickness (mm) | Refractivity | Abbe number |
|---|---|---|---|---|---|
| S13 | Filter G | — | 0.21 | 1.5168 | 64.212 |
| S14 | | — | 0.226 | | |
| S15 | Imaging plane | — | — | | |

In this embodiment, the aspherical coefficients of each lens included in the optical lens 300 are shown in Table 6.

TABLE 6

| Surface No. | k | $A_4$ | $A_6$ | $A_8$ | $A_{10}$ | $A_{12}$ | $A_{14}$ | $A_{16}$ |
|---|---|---|---|---|---|---|---|---|
| S1 | −8.09E−03 | 1.65E−02 | −2.96E−03 | 3.85E−02 | −1.66E−02 | −1.14E−02 | 1.80E−02 | −9.18E−04 |
| S2 | −2.39E+02 | −1.68E−02 | 1.24E−01 | −4.47E−02 | −3.91E−02 | 9.73E−03 | −5.16E−03 | 2.10E−02 |
| S3 | −3.92E+1 | −5.65E−02 | 1.14E−01 | −8.21E−02 | −1.25E−02 | −1.22E−02 | 4.09E−03 | 4.98E−04 |
| S4 | −1.08E+01 | 1.19E−02 | 1.77E−02 | −6.31E−03 | −1.64E−02 | −4.130E−03 | 5.26E−03 | 7.50E−04 |
| S5 | 2.57E+00 | −5.88E−02 | 3.82E−02 | −5.43E−02 | 2.43E−02 | 1.58E−02 | −1.17E−02 | 2.05E−03 |
| S6 | −3.00E+01 | −3.47E−02 | −1.31E−02 | −1.13E−02 | 6.03E−03 | 5.92E−03 | −7.98E−03 | 3.07E−03 |
| S7 | −7.65E+01 | −1.20E−02 | 3.33E−03 | 7.99E−04 | −1.99E−03 | 4.11E−05 | 4.35E−04 | −9.22E−05 |
| S8 | −4.47E+00 | −4.72E−02 | 2.09E−02 | −7.02E−04 | 1.70E−04 | −8.37E−05 | −1.39E−05 | 2.15E−06 |
| S9 | −1.55E+01 | −5.96E−02 | −6.67E−03 | 4.80E−03 | −7.24E−04 | −7.13E−05 | 7.62E−07 | 3.82E−06 |
| S10 | −8.04E+00 | −6.34E−02 | 8.26E−03 | −3.27E−04 | −7.66E−05 | 6.09E−06 | 1.45E−06 | −1.34E−07 |
| S11 | −1.23E+00 | 9.07E−03 | 1.69E−03 | −7.23E−05 | −1.18E−05 | 1.08E−07 | 1.00E−07 | −4.41E−09 |
| S12 | −9.28E+01 | −1.56E−02 | 3.69E−03 | −5.08E−04 | 1.94E−05 | 5.20E−07 | −3.87E−09 | −1.75E−09 |

Figure 11:
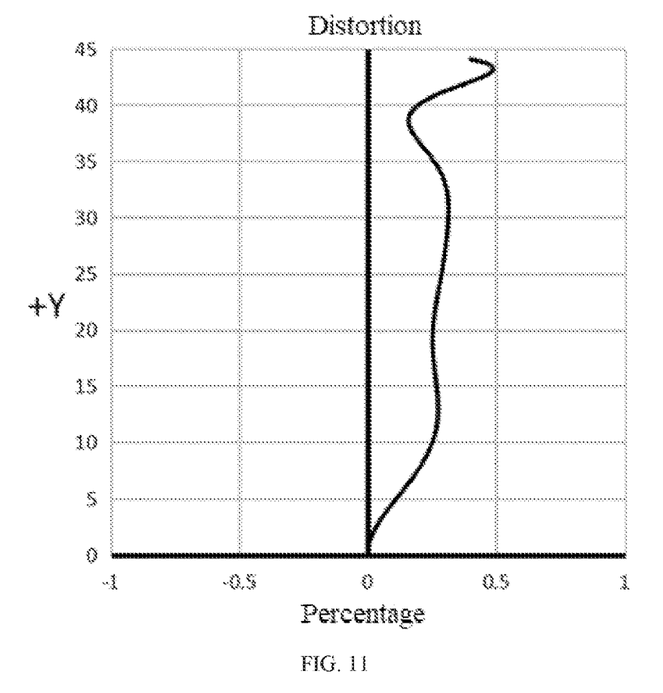
FIG. 11 is a diagram showing a distortion curve of the optical lens, according to the third embodiment of the disclosure.
Figure 12:
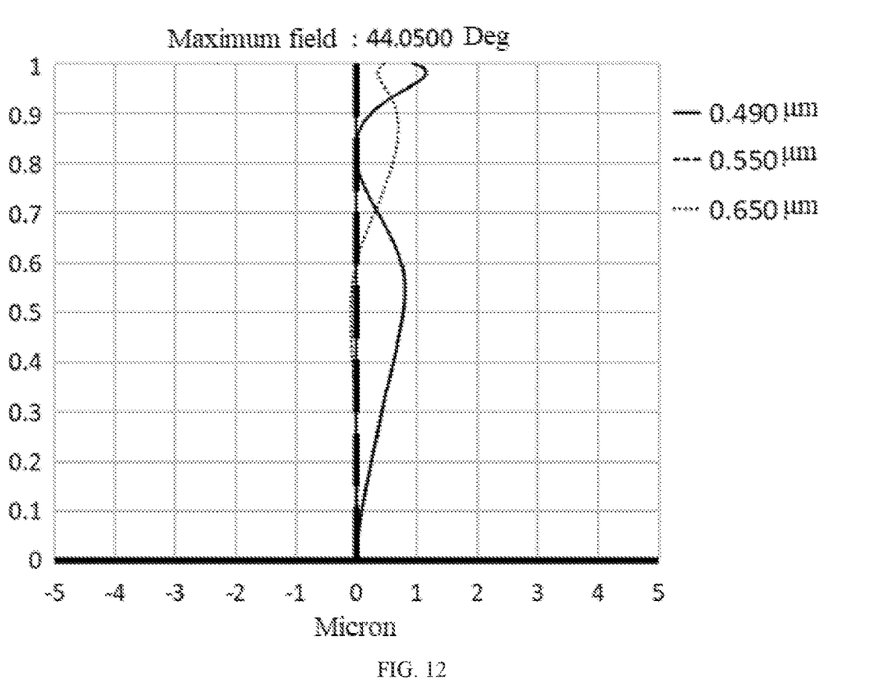
FIG. 12 is a diagram showing lateral chromatic aberration curves of the optical lens, according to the third embodiment of the disclosure.
Figure 13:
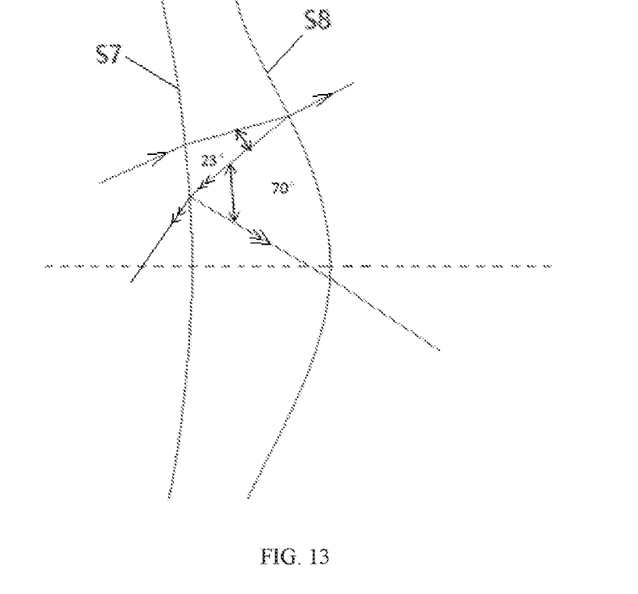
FIG. 13 is a diagram showing an internal reflection light path of light that forms a ghost image, in a fourth lens of the optical lens according to the third embodiment of the disclosure.

FIG. 11 illustrates a diagram showing a distortion curve of the optical lens 300, FIG. 12 illustrates a diagram showing lateral chromatic aberration curves of the optical lens 300, and FIG. 13 illustrates a diagram showing an internal reflection light path of light that forms a ghost image, in the fourth lens L4 of the optical lens 300. As be seen from FIG. 11, the optical distortion is controlled within 0.5%, which indicates that the distortion of the optical lens 300 is well corrected. As be seen from FIG. 12, the lateral chromatic aberration at different wavelengths is controlled within 1.2 μm (the measured data is less than 1.2 μm), which indicates that the lateral chromatic aberration of the optical lens 300 is well corrected. As can be seen from FIG. 13, the incident angle of the second reflection of the ghost image of the fourth lens L4 with respect to the object side surface S7 of the fourth lens is 35°, which does not reach the critical angle, thus the total reflection will not occur, thereby effectively reducing the energy of the ghost image.

Table 7 shows the corresponding optical characteristics of the optical lenses provided in the above three embodiments, including the focal length f, F number F#, total optical length TTL, and field of view 2θ of the optical lens, and the values corresponding to each of the aforementioned expressions.

TABLE 7

| | First embodiment | Second embodiment | Third embodiment | remarks |
|---|---|---|---|---|
| f (mm) | 4.057 | 4.059 | 4.038 | |
| F# | 2.2 | 2.2 | 2.2 | |
| TTL (mm) | 5.388 | 5.434 | 5.430 | |
| 2θ | 88.1° | 88.1° | 88.1° | |
| IH (mm) | 4.0 | 4.0 | 4.0 | |
| $SAG8D_{0.5}/SAG8D_1$ | 0.380 | 0.501 | 0.507 | Expression (1) |
| $R_7/D_7$ | −0.757 | −1.360 | −1.531 | Expression (2) |
| $(1/f_1 - 1/f_3)/(1/f)$ | 0.170 | −0.107 | 0.185 | Expression (3) |
| $R_1/D_i$ | 0.985 | 1.087 | 1.198 | Expression (4) |
| IH/tanθ | 4.14 | 4.14 | 4.14 | Expression (5) |
| $DT/D_1$ | 1.013 | 1.012 | 1.006 | Expression (6) |
| DT/IH | 0.482 | 0.478 | 0.465 | Expression (7) |
| $SAG5_i - SAG5_j$ | −0.007 | −0.003 | −0.005 | Expression (8) |
| $SAG6_i - SAG6_j$ | −0.006 | −0.022 | −0.013 | Expression (9) |
| $f_1/f_2$ | −0.308 | −0.442 | −0.494 | Expression (10) |
| $θ_{12}/θ_λ$ | 0.061 | 0.084 | 0.132 | Expression (11) |
| $R_8/D_8$ | −0.452 | −0.387 | −0.346 | Expression (12) |

It can be seen from the diagrams showing a distortion curve and lateral chromatic aberration curves in each of the above embodiments that the lateral chromatic aberration of the optical lens is less than 1.2 μm (the measured data is less than 1.2 μm) and the distortion is less than 0.75% in each embodiment, indicating the imaging picture of the lens has small distortion and high definition. It can be seen from the reflection path of the ghost image the fourth lens L4 that the secondary reflection angle in the fourth lens L4 is less than the critical angle in each embodiment, which effectively avoids total reflection and greatly reduces the energy of the ghost image, thereby making the imaging quality higher.

In summary, by reasonably selecting the lens shapes and focal powers of respective lenses, the optical lens provided by the embodiment of the disclosure effectively corrects the ghost image of the optical lens. Therefore, the optical lens provided by the embodiment of the disclosure has the advantages of low ghost image energy and high imaging quality. It has good applicability to portable electronic devices and can effectively improve user experience.

Fourth Embodiment

Figure 14:
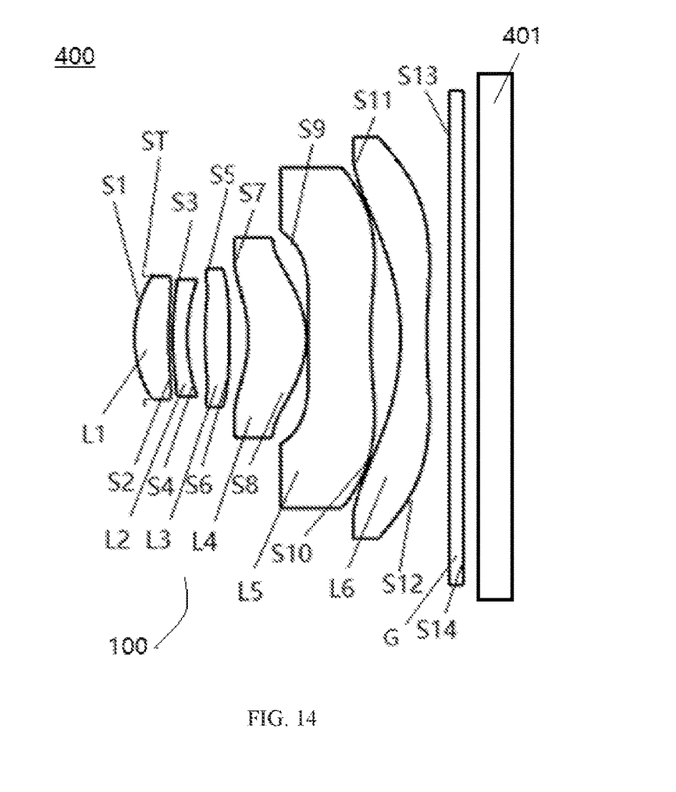
FIG. 14 is a schematic structural diagram of an imaging device, according to a fourth embodiment of the disclosure.

FIG. 14 illustrates a schematic structural diagram of an imaging device 400, according to the fourth embodiment, the imaging device 400 includes the optical lens (for example, the optical lens 100) according to any one of the above embodiments and an imaging component 401. The imaging component 401 may be a CMOS (Complementary Metal Oxide Semiconductor) image sensor or a CCD (Charge Coupled Device) image sensor.

The imaging device 400 may be a camera, a mobile terminal, or any other electronic device loaded with an optical lens. The mobile terminal may be a smart phone, a smart tablet, a smart reader, or other terminal devices.

The imaging device 400 of this embodiment includes an optical lens. Since the optical lens has the advantages of low ghost image energy, wide field of view, high imaging quality, and high product yield, the imaging device 400 has the advantages of low ghost image energy, wide field of view, high imaging quality, and high product yield.

Fifth Embodiment

Figure 15:
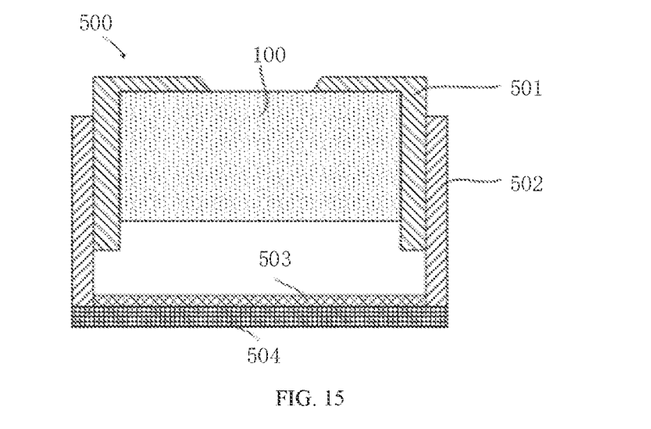
FIG. 15 is a schematic structural diagram showing a cross-section of a camera module provided by a fifth embodiment of the present disclosure.

Referring to FIG. 15, a cross-section of a camera module 500 provided by this embodiment is illustrated. The camera module 500 includes a barrel 501, a holder 502, an image sensor 503, a printed circuit board 504, and the optical lens 100 provided by any of the embodiments as described above. The optical lens 100 is received in the barrel 501, and the barrel 501 is engaged with the holder 502. The image sensor 503 and the printed circuit board 504 are substantially accommodated in the holder 502. The image sensor 503 is opposite to the optical lens 100 and is mounted on the printed circuit board 504. The image sensor 503 is configured for converting images formed by the optical lens 100 into electrical signals, thereby the images formed by the optical lens 100 can be converted and transmitted to a processor The printed circuit board 504 can be further electrically connected to a chip or the processor via a flexible circuit board.

Sixth Embodiment

Figure 16:
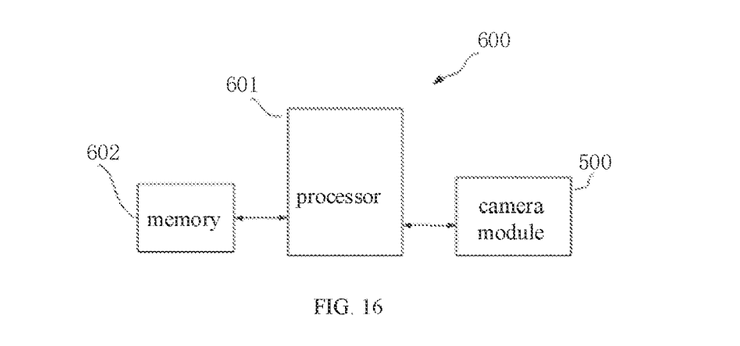
FIG. 16 is a schematic block diagram of a camera provided by a sixth embodiment of the present disclosure.
Figure 17:
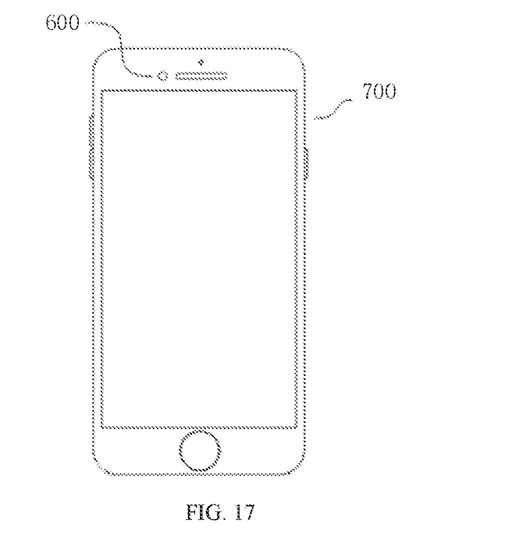
FIG. 17 is a schematic diagram of the camera provided by the sixth embodiment of the present disclosure.

Referring to FIG. 16 and FIG. 17, a camera 600 is applied to an electronic device 700. Here, the camera 600 is illustrated as a front camera of the electronic device 700, but it also may be a rear camera of the electronic device 700, which is not limited in the embodiments of the present disclosure. The camera 600 includes the camera module 500 as mentioned above, a processor 601, and a memory 602. The camera module 500 is configured to capture one or more images, the processor 601 is configured to process the captured one or more images, and the memory 602 is configured to store the captured one or more images. The processor 601 is communicated with the camera module 500 and the memory 602. That is, the electrical signals of the images can be transmitted to the processor 601 and stored in the memory 602.

The above embodiments are only used to illustrate the technical solutions of the disclosure, but not to limit the disclosure. Although the disclosure has been described in detail with reference to the above embodiments, those of ordinary skill in the art should understand that they can still modify the technical solutions recorded in the above embodiments, or equivalently replace some of the technical features in the technical solutions, and these modifications or substitutions do not make the essence of the corresponding technical solutions deviate from the spirit and scope of the technical solutions of the embodiments of the disclosure.

What is claimed is:

1. An optical lens, from an object side to an image side along an optical axis, sequentially comprising:
    a stop;
    a first lens having a positive focal power, an object side surface of the first lens being convex;
    a second lens having a negative focal power, an image side surface of the second lens being concave;
    a third lens having a positive focal power, and an object side surface and an image side surface of the third lens being both convex and of no inflection point;
    a fourth lens having a positive focal power, an object side surface of the fourth lens being concave, and an image side surface of the fourth lens being convex proximate to the optical axis;
    a fifth lens having a negative focal power, an object side surface of the fifth lens being convex proximate to the optical axis, and an image side surface of the fifth lens being concave proximate to the optical axis;
    a sixth lens having a negative focal power, an object side surface of the sixth lens being concave proximate to the optical axis; and
    a filter;
    wherein the optical lens meets the expression:

$SAG8D_{0.5}/SAG8D_1 > 0.35;$ where $SAG8D_{0.5}$ represents a sagittal height at a position corresponding to half a diameter of the image side surface of the fourth lens, and $SAG8D_1$ represents a sagittal height at a position corresponding to the diameter of the image side surface of the fourth lens.

2. The optical lens as claimed in claim 1, wherein the optical lens meets the expression:

$R_7/D_7 < -0.7;$ where $R_7$ represents a radius of curvature of the object side surface of the fourth lens, and $D_7$ represents a diameter of the object side surface of the fourth lens.

3. The optical lens as claimed in claim 1, wherein the optical lens meets the expressions:

$-0.12 < (1/f_1 - 1/f_3)/(1/f) < 0.2;$ $R_1/D_i > 0.98;$ where $f_1$ represents a focal length of the first lens, $f_3$ represents a focal length of the third lens, f represents a focal length of the optical lens, $R_1$ represents a radius of curvature of the object side surface of the first lens, and $D_i$ represents an entrance pupil diameter of the optical lens.

4. The optical lens as claimed in claim 1, wherein the optical lens meets the expression:

$4.13 \text{ mm} < IH/\tan \theta < 4.18 \text{ mm};$ where IH represents half an actual image height of the optical lens, and θ represents half a field of view of the optical lens.

5. The optical lens as claimed in claim 1, wherein the optical lens meets the expression:

$1 < DT/D_1 < 1.02;$ where DT represents a diameter of the stop of the optical lens, and $D_1$ represents a diameter of the object side surface of the first lens.

6. The optical lens as claimed in claim 1, wherein the optical lens meets the expression:

$0.46 < DT/IH < 0.49;$ where DT represents a diameter of the stop of the optical lens, and IH represents half an actual image height of the optical lens.

7. The optical lens as claimed in claim 1, wherein the optical lens meets the expressions:

$SAG5_f - SAG5_j < 0;$ $SAG6_f - SAG6_j < 0;$ where j=i+0.1, $SAG5_i$ represents a sagittal height at a position of the object side surface of the third lens spaced from the optical axis i mm, $SAG5_j$ represents a sagittal height at a position of the object side surface of the third lens spaced from the optical axis j mm, $SAG6_i$ represents a sagittal height at a position of the image side surface of the third lens spaced from the optical axis i mm; and $SAG6_j$ represents a sagittal height at a position of the image side surface of the third lens spaced from the optical axis j mm.

8. The optical lens as claimed in claim 1, wherein the optical lens meets the expression:

$-1 < f_1/f_2 < -0.3$;

where $f_1$ represents a focal length of the first lens, and $f_2$ represents a focal length of the second lens.

9. The optical lens as claimed in claim 1, wherein the optical lens meets the expression:

$0 < \theta_{12}/\theta_\lambda < 0.15$;

where $\theta_{12}$ represents a dip angle at an edge of an image side surface of the sixth lens, and $\theta_\lambda$ represents a chief ray angle of the optical lens.

10. The optical lens as claimed in claim 1, wherein the optical lens meets the expression:

$-0.5 < R_8/D_8 < -0.3$;

where $R_8$ represents a radius of curvature of the image side surface of the fourth lens, and $D_8$ represents a diameter of the image side surface of the fourth lens.

11. The optical lens as claimed in claim 1, wherein the first lens, the second lens, the third lens, the fourth lens, the fifth lens, and the sixth lens are all aspherical lenses.

12. The optical lens as claimed in claim 1, wherein an image side surface of the first lens is concave.

13. The optical lens as claimed in claim 1, wherein a maximum diameter of the sixth lens is greater than that of each of the first lens, the second lens, the third lens, the fourth lens and the fifth lens.

14. The optical lens as claimed in claim 1, wherein an object side surface of the second lens is convex.

15. A camera module, comprising an optical lens and an image sensor opposite to the optical lens, wherein the optical lens, from an object side to an image side along an optical axis, sequentially comprises:
a stop;
a first lens having a positive focal power, an object side surface of the first lens being convex;
a second lens having a negative focal power, an image side surface of the second lens being concave;
a third lens having a positive focal power, and an object side surface and an image side surface of the third lens being both convex and of no inflection point;
a fourth lens having a positive focal power, an object side surface of the fourth lens being concave, and an image side surface of the fourth lens being convex proximate to the optical axis;
a fifth lens having a negative focal power, an object side surface of the fifth lens being convex proximate to the optical axis, and an image side surface of the fifth lens being concave proximate to the optical axis;
a sixth lens having a negative focal power, an object side surface of the sixth lens being concave proximate to the optical axis; and
a filter;
wherein the optical lens meets the expressions:

$SAG8D_{0.5}/SAG8D_1 > 0.35$;

where $SAG8D_{0.5}$ represents a sagittal height at a position corresponding to half a diameter of the image side surface of the fourth lens, and $SAG8D_1$ represents a sagittal height at a position corresponding to the diameter of the image side surface of the fourth lens.

16. The camera module as claimed in claim 15, wherein the optical lens meets the expressions:

$R_7/D_7 < -0.7$;

$-0.5 < R_8/D_8 < -0.3$;

where $R_7$ represents a radius of curvature of the object side surface of the fourth lens, $D_7$ represents a diameter of the object side surface of the fourth lens, $R_8$ represents a radius of curvature of the image side surface of the fourth lens, and $D_8$ represents a diameter of the image side surface of the fourth lens.

17. The camera module as claimed in claim 15, wherein the optical lens meets the expressions:

$-0.12 < (1/f_1 - 1/f_3)/(1/f) < 0.2$;

$R_1/D_i > 0.98$;

where $f_1$ represents a focal length of the first lens, $f_3$ represents a focal length of the third lens, f represents a focal length of the optical lens, $R_1$ represents a radius of curvature of the object side surface of the first lens, and $D_i$ represents an entrance pupil diameter of the optical lens.

18. The camera module as claimed in claim 15, wherein the optical lens meets the expressions:

$1 < DT/D_1 < 1.02$;

$0.46 < DT/IH < 0.49$;

where DT represents a diameter of the stop of the optical lens, $D_1$ represents a diameter of the object side surface of the first lens, and IH represents half an actual image height of the optical lens.

19. The camera module as claimed in claim 15, wherein the optical lens meets the expression:

$-1 < f_1/f_2 < -0.3$;

where $f_1$ represents a focal length of the first lens, and $f_2$ represents a focal length of the second lens.

20. An electronic device, comprising:
a camera module, configured to capture one or more images;
a processor, configured to process the captured one or more images; and
a memory, configured to store the captured one or more images;
wherein the camera module comprises an optical lens and an image sensor opposite to the optical lens, and the optical lens, from an object side to an image side along an optical axis, comprises:
a stop;
a first lens having a positive focal power, an object side surface of the first lens being convex;
a second lens having a negative focal power, an image side surface of the second lens being concave;
a third lens having a positive focal power, and an object side surface and an image side surface of the third lens being both convex and of no inflection point;
a fourth lens having a positive focal power, an object side surface of the fourth lens being concave, and an image side surface of the fourth lens being convex proximate to the optical axis;

a fifth lens having a negative focal power, an object side surface of the fifth lens being convex proximate to the optical axis, and an image side surface of the fifth lens being concave proximate to the optical axis;

a sixth lens having a negative focal power, an object side surface of the sixth lens being concave proximate to the optical axis; and a filter;

wherein the optical lens meets the expressions:

$$SAG8D_{0.5}/SAG8D_1 > 0.35;$$

where $SAG8D_{0.5}$ represents a sagittal height at a position corresponding to half a diameter of the image side surface of the fourth lens, and $SAG8D_1$ represents a sagittal height at a position corresponding to the diameter of the image side surface of the fourth lens.

* * * * *